(12) United States Patent
Kurosawa

(10) Patent No.: US 6,675,301 B1
(45) Date of Patent: Jan. 6, 2004

(54) MICROCOMPUTER MALFUNCTION PREVENTIVE APPARATUS AND MICROCOMPUTER MALFUNCTION PREVENTIVE METHOD

(75) Inventor: Hitoshi Kurosawa, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/558,322

(22) Filed: Apr. 26, 2000

(30) Foreign Application Priority Data

Oct. 26, 1999 (JP) .......................... 11-304641

(51) Int. Cl.⁷ .............................. G06F 1/30
(52) U.S. Cl. .................... 713/300; 713/601; 322/58
(58) Field of Search ................... 713/1, 300, 310, 713/320, 340; 340/659; 307/269; 395/185.08; 327/143; 322/58

(56) References Cited

U.S. PATENT DOCUMENTS

| | | | | |
|---|---|---|---|---|
| 4,124,887 A | * | 11/1978 | Johnson et al. ............... 700/9 |
| 5,099,140 A | * | 3/1992 | Mudgett .................... 327/144 |
| 5,274,827 A | * | 12/1993 | Haggerty et al. ........... 365/226 |
| 5,485,111 A | * | 1/1996 | Tanimoto ................... 327/143 |
| 5,513,319 A | * | 4/1996 | Finch et al. ................. 714/55 |
| 5,649,213 A | * | 7/1997 | Kurihara et al. ............ 713/323 |
| 5,698,968 A | * | 12/1997 | Takagi et al. ................ 322/58 |
| 5,774,649 A | * | 6/1998 | Goh ............................. 714/55 |
| 5,850,514 A | * | 12/1998 | Gonda et al. ................. 714/55 |
| 5,973,871 A | * | 10/1999 | Dunn et al. .................. 360/69 |
| 6,259,371 B1 | * | 7/2001 | Chang ......................... 340/659 |
| 6,347,379 B1 | * | 2/2002 | Dai et al. .................... 713/320 |

FOREIGN PATENT DOCUMENTS

| | | | | |
|---|---|---|---|---|
| JP | 04277922 A | * | 10/1992 | .......... H03K/17/22 |
| JP | 05283994 A | * | 10/1993 | .......... H03K/17/22 |
| JP | 06289961 A | * | 10/1994 | ............ G06F/1/24 |
| JP | 07273290 A | * | 10/1995 | .......... H01L/27/04 |
| JP | 9-26835 | | 1/1997 | |

OTHER PUBLICATIONS

IBM TDB, Automotive Engine Parameter Card for a Personal Computer System, Dec. 1, 1991, vol. 34 Issue 34 pp. 355–356.*

* cited by examiner

Primary Examiner—Thomas Lee
Assistant Examiner—Mark Connolly
(74) Attorney, Agent, or Firm—Leydig, Voit & Mayer, Ltd.

(57) ABSTRACT

A microcomputer malfunction preventive apparatus that halts supplying of a clock signal to a microcomputer when fluctuations in a supply voltage deviate from an acceptable range, and resumes supplying of the clock signal to the microcomputer when the fluctuations return to the acceptable range.

11 Claims, 7 Drawing Sheets

MICROCOMPUTER MALFUNCTION PREVENTIVE APPARATUS AND MICROCOMPUTER MALFUNCTION PREVENTIVE METHOD

BACKGROUND OF THE INVENTION

1. Field of the Invention

The present invention relates to a microcomputer malfunction preventive apparatus and a microcomputer malfunction preventive method for preventing a malfunction of a microcomputer due to variations in a supply voltage.

2. Description of Related Art

FIG. 7 is a block diagram showing a configuration of a conventional microcomputer malfunction preventive apparatus. In FIG. 7, the reference numeral 1 designates an external power supply such as an ordinary power supply unit or a battery; 2 designates a regulator for regulating a voltage supplied from the external power supply 1 to a microcomputer 4; and 3 designates a capacitor such as a bypass capacitor for supplying power to the microcomputer 4 in case of transient power shortage of the external power supply 1.

The reference numeral 4 designates the microcomputer; 5 designates an internal power supply built in the microcomputer 4; and 6 designates a capacitor connected to a power line to the microcomputer 4 for eliminating the transient power shortage just as the capacitor 3.

Next, the operation of the conventional apparatus will be described.

To stabilize the power supplied to the microcomputer 4, the malfunction preventive apparatus includes not only the external power supply 1, but also the regulator 2 for stabilizing the voltage supplied to the microcomputer 4, besides the internal power supply 5 installed in the microcomputer 4.

In addition, to prevent the malfunction of the microcomputer 4 caused by a voltage reduction because of the transient power shortage in the external power supply 1 or in internal power supply 5, the capacitors 3 and 6 are connected to the power line to the microcomputer 4, thereby eliminating the transient power supply shortage.

However, installing the regulator 2 outside the microcomputer 4 is contrary to an increasing miniaturization of a recent semiconductor board, and mounting a large capacitor 6 on the power line to the microcomputer 4 becomes increasingly difficult because of the recent trend toward further thinning the line width of semiconductor components.

Furthermore, the built-in capacitors 3 and 6 cannot cope with an unexpected power supply shortage. In other words, the preventive measure against the transient power shortage using only the capacitors 3 and 6 has its own limit.

Therefore, it is essential for implementing a necessary and sufficient measure against the transient instability of the power supply to install a stabilized power supply unit outside the microcomputer 4.

With the foregoing arrangement, although the conventional microcomputer malfunction preventive apparatus can handle the power shortage within the expected range, it cannot cope with the power shortage beyond the expected range. Thus, to prevent the malfunction of the microcomputer 4 involved in the power supply instability, it is necessary to install a stabilized power supply unit outside the microcomputer 4, which presents a problem of increasing the dimension of the semiconductor board.

In addition to the foregoing conventional technique, Japanese patent application laid-open Nos. 8-181590/1996 and 5-108194/1993 each disclose a technique of halting the clock supply to a microcomputer when the supply voltage falls below a reference voltage in order to prevent the malfunction of the microcomputer caused by the power supply instability.

Although these techniques can handle the malfunction of the microcomputer due to a gradual reduction in the supply voltage, they cannot cope with the malfunction of the microcomputer resulting from a sudden change in the supply voltage even if the supply voltage is above the reference voltage.

SUMMARY OF THE INVENTION

The present invention is implemented to solve the foregoing problems. It is therefore an object of the present invention to provide a microcomputer malfunction preventive apparatus and a microcomputer malfunction preventive method capable of preventing the malfunction of a microcomputer involved in power supply instability without installing a competent stabilized power supply outside the microcomputer.

According to a first aspect of the present invention, there is provided a microcomputer malfunction preventive apparatus comprising: a fluctuation detector for detecting fluctuations in a supply voltage; and a clock controller for halting supplying a clock signal to a microcomputer when the fluctuations detected by the fluctuation detector deviate from an acceptable range, and for resuming supplying the clock signal to the microcomputer when the fluctuations return to the acceptable range.

Here, the fluctuation detector may comprise: a first bias circuit connected to a power line; a second bias circuit connected to the power line, and having a time constant different from that of the first bias circuit; and a comparator for comparing an output voltage of the first bias circuit with an output voltage of the second bias circuit.

The microcomputer malfunction preventive apparatus may further comprise a voltage detector for detecting the supply voltage, wherein the clock controller may continue halting the supply of the clock signal to the microcomputer if the supply voltage detected by the voltage detector is lower than a reference voltage even after the fluctuations detected by the fluctuation detector return to the acceptable range after the supply of the clock signal to the microcomputer has been halted.

The microcomputer malfunction preventive apparatus may further comprise a voltage detector for detecting the supply voltage, wherein the clock controller may supply the microcomputer with a secondary clock signal with a frequency lower than a frequency of the clock signal if the supply voltage detected by the voltage detector is lower than a reference voltage even after the fluctuations detected by the fluctuation detector return to the acceptable range after the clock controller halts the supply of the clock signal to the microcomputer.

The microcomputer malfunction preventive apparatus may further comprise a voltage detector for detecting the supply voltage; and a reset circuit for resetting the microcomputer when the supply voltage detected by the voltage detector falls below a reference voltage after the clock controller halts supplying the clock signal to the microcomputer.

The microcomputer malfunction preventive apparatus may further comprise: a voltage detector for detecting the supply voltage; and an interrupt controller for generating an interrupt signal when the supply voltage detected by the voltage detector falls below a reference voltage after the clock controller halts supplying the clock signal to the microcomputer.

According to a second aspect of the present invention, there is provided a microcomputer malfunction preventive method comprising the steps of: monitoring fluctuations in a supply voltage; halting supplying a clock signal to a microcomputer when the fluctuations in the supply voltage deviate from an acceptable range; and resuming supplying the clock signal to the microcomputer when the fluctuations return to the acceptable range.

Here, the microcomputer malfunction preventive method may further comprise the step of continuing halting the supply of the clock signal to the microcomputer if the supply voltage is lower than a reference voltage even after the fluctuations in the supply voltage return to the acceptable range after the supply of the clock signal to the microcomputer has been halted.

The microcomputer malfunction preventive method may further comprise the step of supplying the microcomputer with a secondary clock signal with a frequency lower than that of the clock signal if the supply voltage is lower than a reference voltage even after the fluctuations in the supply voltage return to the acceptable range after the supply of the clock signal to the microcomputer has been halted.

The microcomputer malfunction preventive method may further comprise the step of resetting the microcomputer when the supply voltage falls below a reference voltage after the supply of the clock signal to the microcomputer has been halted.

The microcomputer malfunction preventive method may further comprise the step of generating an interrupt signal when the supply voltage falls below a reference voltage after the supply of the clock signal to the microcomputer has been halted.

DETAILED DESCRIPTION OF THE PREFERRED EMBODIMENTS

The invention will now be described with reference to the accompanying drawings.

EMBODIMENT 1

Figure 1:
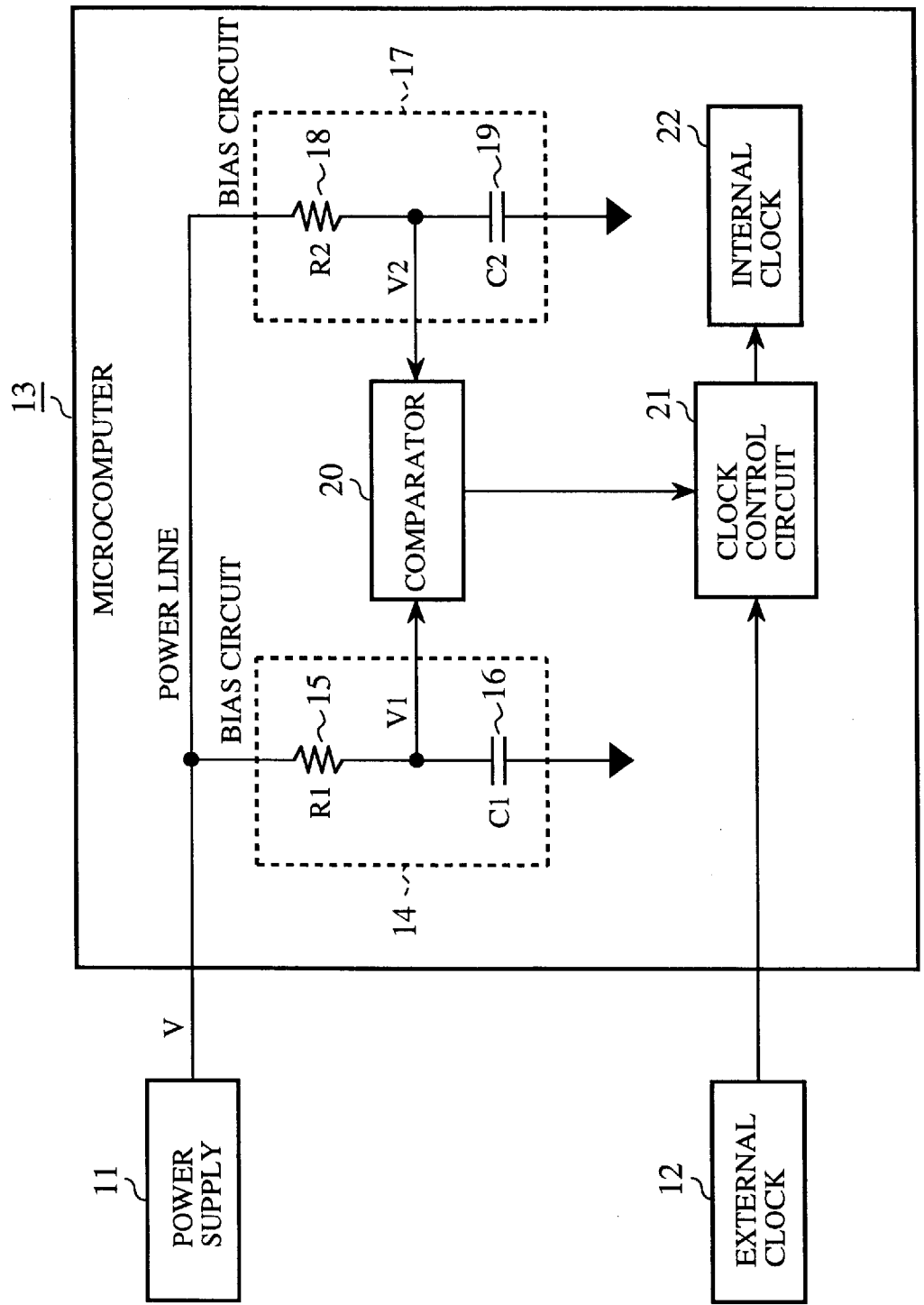
FIG. 1 is a block diagram showing a configuration of an embodiment 1 of a microcomputer malfunction preventive apparatus in accordance with the present invention.

FIG. 1 is a block diagram showing a configuration of an embodiment 1 of a microcomputer malfunction preventive apparatus in accordance with the present invention. In FIG. 1, the reference numeral 11 designates a power supply such as an ordinary power supply unit or a battery for supplying power to a microcomputer 13; and 12 designates an external clock such as a clock generator or a crystal oscillator for supplying a clock signal to the microcomputer 13.

The reference numeral 13 designates the microcomputer; 14 designates a bias circuit (first bias circuit) connected to a power line to the microcomputer 13; 15 designates a resistor with a resistance R1; 16 designates a capacitor with a capacitance C1; 17 designates a bias circuit (second bias circuit) that is connect to the power line to the microcomputer 13 and has a time constant different from that of the bias circuit 14; 18 designates a resistor with a resistance R2; 19 designates a capacitor with a capacitance C2; and 20 designates a comparator for comparing the output voltage V1 of the bias circuit 14 with the output voltage V2 of the bias circuit 17 to detect fluctuations in the supply voltage V.

Here, the bias circuits 14 and 17, and the comparator 20 constitute a fluctuation detector.

The reference numeral 21 designates a clock control circuit for controlling an internal clock 22 such that it halts supplying the operation clock signal to the microcomputer 13 when the fluctuations in the supply voltage V detected by the comparator 20 deviates from an acceptable range, and resumes supplying the operation clock signal to the microcomputer 13 when the fluctuations return to the acceptable range; and 22 designates the internal clock for oscillating the operation clock signal to the microcomputer 13.

Here, the external clock 12, clock control circuit 21 and internal clock 22 constitute a clock controller.

Figure 2:
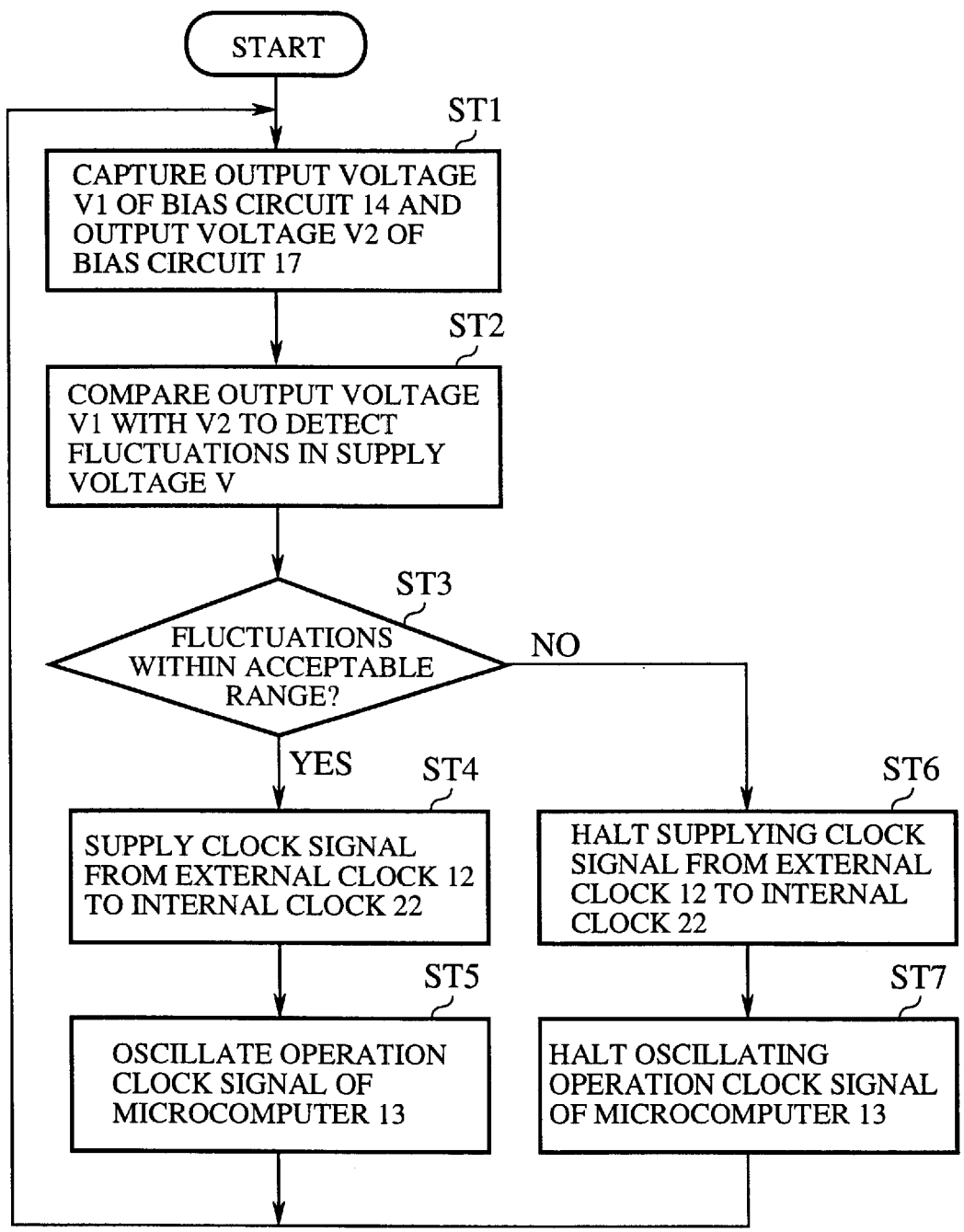
FIG. 2 is a flowchart illustrating a microcomputer malfunction preventive method of the embodiment 1.

FIG. 2 is a flowchart illustrating a microcomputer malfunction preventive method in accordance with the present embodiment 1.

Next, the operation of the present embodiment 1 will be described with reference to FIG. 2.

First, when the power supply 11 starts supplying power to the microcomputer 13, the supply voltage V is applied to the power line to the microcomputer 13.

The fluctuations in the supply voltage V of the power line can cause a malfunction and runaway of the microcomputer 13.

In the present embodiment 1, the comparator 20 compares the output voltage V1 of the bias circuit 14 with the output voltage V2 of the bias circuit 17, thereby detecting the fluctuations in the supply voltage V (steps ST1 and ST2).

More specifically, although both the output voltages V1 and V2 of the bias circuits 14 and 17 fluctuate when the supply voltage V fluctuates, the fluctuation pattern, i.e., the rate of change of the output voltage of the bias circuit 14 differs from the rate of change of the output voltage of the bias circuit 17 because of the difference between the time constant $\tau_1$ of the bias circuit 14 and the time constant $\tau_2$ of the bias circuit 17. Thus, detecting the difference between the output voltage V1 of the bias circuit 14 and the output voltage V2 of the bias circuit 17 makes it possible to detect the degree of the variation, i.e., the rate of change, in the supply voltage V. This is expressed as follows:

$\tau_1 = R_1 \times C_1$ $\tau_2 = R_2 \times C_2$ $\tau_1 < \tau_2$, or $\tau_1 > \tau_2$ When the comparator 20 detects the fluctuations in the supply voltage V, the clock control circuit 21 makes a decision as to whether the fluctuations in the supply voltage V are held within the acceptable range or not (step ST3).

If the fluctuations in the supply voltage V are within the acceptable range, the clock signal fed from the external clock 12 is supplied to the internal clock 22 (step ST4) so that the internal clock 22 oscillates the operation clock signal of the microcomputer 13 (step ST5).

In contrast, if the fluctuations in the supply voltage V deviate from the acceptable range, the microcomputer 13 is in danger of malfunction. Thus, the external clock 12 halts supplying the clock signal to the internal clock 22 (step ST6) so that the internal clock 22 stops the oscillation of the operation clock signal to the microcomputer 13 (step ST7). This will temporarily halts the operation of the microcomputer 13.

Subsequently, if the fluctuations in the supply voltage V return to the acceptable range, the internal clock 22 resumes the oscillation of the operation clock signal to the microcomputer 13 (step ST5) in response to the clock signal fed from the external clock 12 to the internal clock 22 (step ST4) Thus, the microcomputer 13 resumes its operation.

As described above, the present embodiment 1 is configured such that it halts supplying the clock signal to the microcomputer 13 if the fluctuations in the supply voltage V deviate from the acceptable range, and resumes supplying the clock signal to the microcomputer 13 if the fluctuations in the supply voltage V return to the acceptable range. This offer an advantage of being able to prevent the malfunction of the microcomputer 13 involved in the power supply instability without installing a competent stabilized power supply unit outside the microcomputer 13.

EMBODIMENT 2

Figure 3:
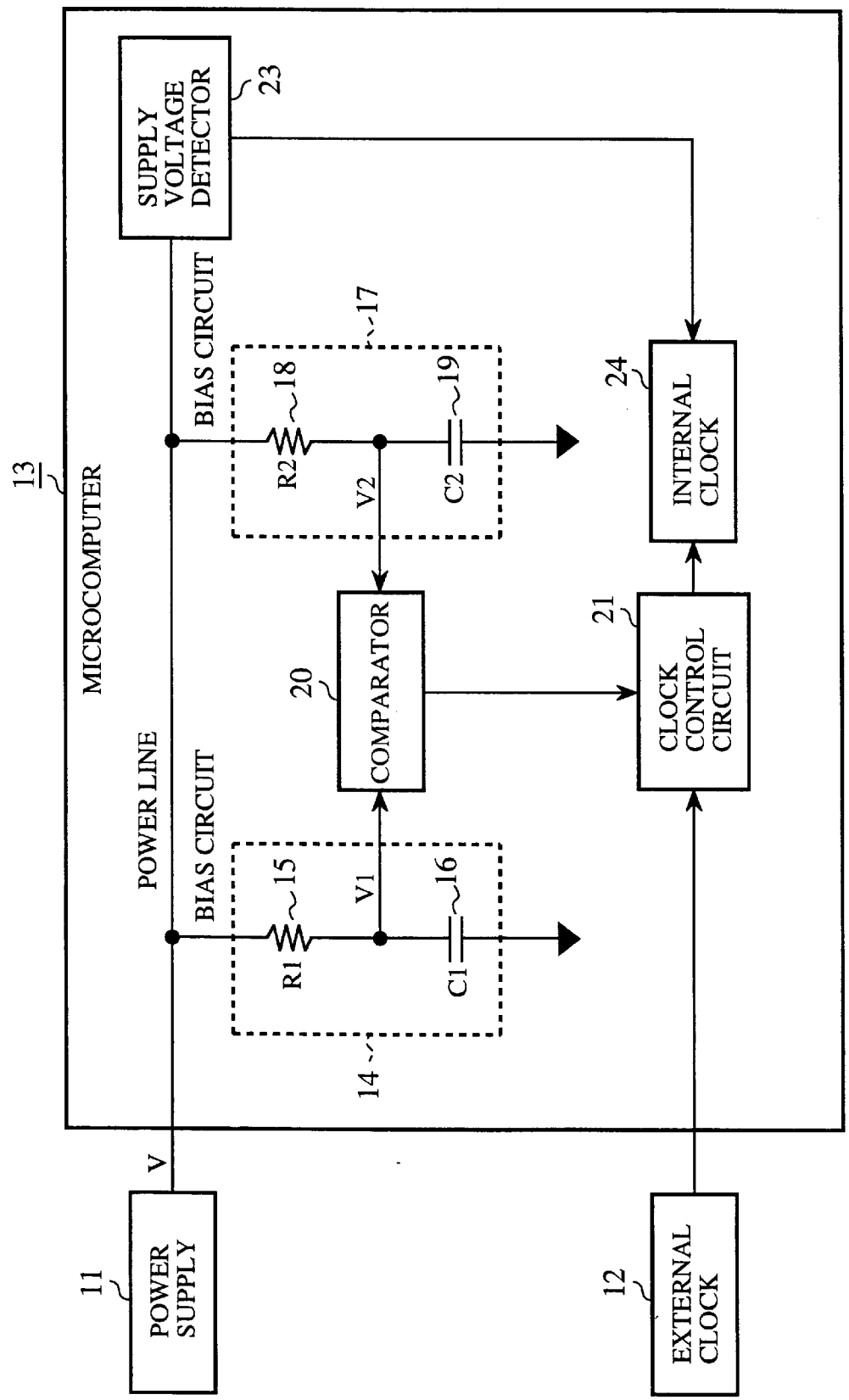
FIG. 3 is a block diagram showing a configuration of an embodiment 2 of the microcomputer malfunction preventive apparatus in accordance with the present invention.

FIG. 3 is a block diagram showing a configuration of an embodiment 2 of the microcomputer malfunction preventive apparatus in accordance with the present invention. In FIG. 3, the same or like portions to those of FIG. 1 are designated by the same reference numerals, and the description thereof is omitted here.

The reference numeral 23 designates a supply voltage detector for detecting the supply voltage V; and 24 designates an internal clock (clock controller) for continuing, when the supply voltage V detected by the supply voltage detector 23 is lower than a reference voltage Vref, halting the operation clock signal to the microcomputer 13 even if the clock control circuit 21 resumes supplying the clock signal it has halted previously.

Next, the operation of the present embodiment 2 will be described.

In the foregoing embodiment 1, the internal clock 22 resumes the oscillation of the operation clock signal to the microcomputer 13 when the fluctuations in the supply voltage V return to the acceptable range. However, if the supply voltage V is lower than the reference voltage Vref even after the fluctuations in the supply voltage V return to the acceptable range, the microcomputer 13 is in danger of malfunction.

In view of this, in the present embodiment 2, when the supply voltage V is lower than the reference voltage Vref even after. the fluctuations in the supply voltage V return to the acceptable range, the internal clock 24 continues halting the supply of the operation clock signal to the microcomputer 13, thereby preventing the malfunction of the microcomputer 13 from taking place.

As described above, the present embodiment 2 is configured such that when the supply voltage V is lower than the reference voltage Vref even after the fluctuations in the supply voltage V return to the acceptable range, it continues halting the supply of the operation clock signal to the microcomputer 13. This offers an advantage of being able to prevent the malfunction of the microcomputer 13 more positively than the foregoing embodiment 1.

EMBODIMENT 3

Although the internal clock 24 continues halting the supply of the operation clock signal to the microcomputer 13 as long as the supply voltage V is lower than the reference voltage Vref in the foregoing embodiment 2, if the supply voltage V is in a range in which the microcomputer 13 can operate at a lower rate even if a high-speed operation is impossible (such as in the case where the supply voltage V is lower than the reference voltage Vref, but is higher than a minimum operation voltage), the low rate operation clock signal can be supplied to the microcomputer 13.

This offers an advantage of being able to maintain the operation state of the microcomputer 13 with preventing the malfunction of the microcomputer 13.

EMBODIMENT 4

Figure 4:
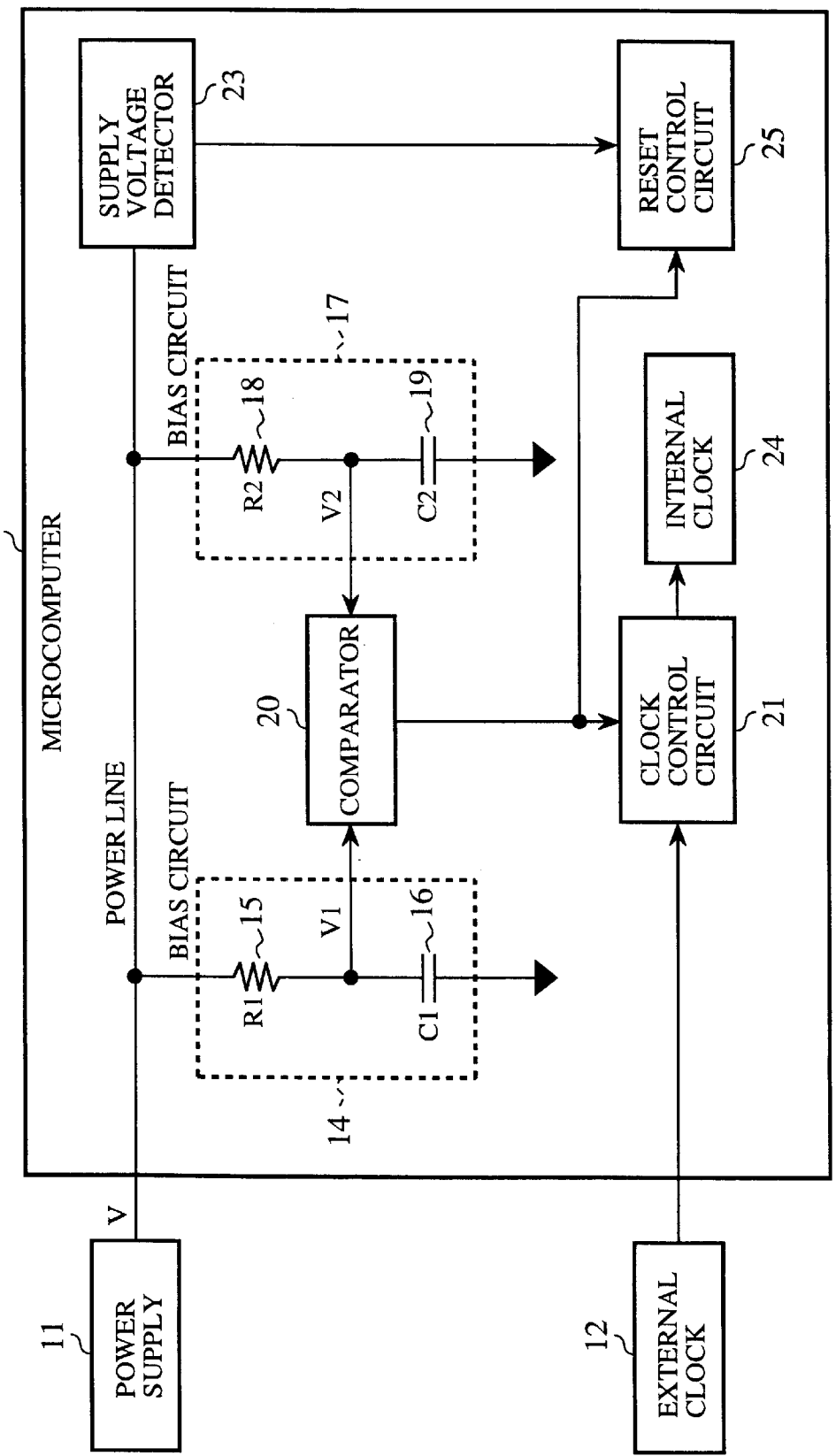
FIG. 4 is a block diagram showing a configuration of an embodiment 4 of the microcomputer malfunction preventive apparatus in accordance with the present invention.

FIG. 4 is a block diagram showing a configuration of an embodiment 4 of the microcomputer malfunction preventive apparatus in accordance with the present invention. In FIG. 4, the same or like portions to those of FIG. 3 are designated by the same reference numerals, and the description thereof is omitted here.

The reference numeral 25 designates a reset control circuit for resetting the microcomputer 13 when supply voltage V falls below the reference voltage Vref after the internal clock 24 halts supplying the operation clock signal to the microcomputer 13.

Next, the operation of the present embodiment 4 will be described.

Although the supply of the operation clock signal to the microcomputer 13 is kept halted in the foregoing embodiment 2 if the supply voltage V is lower than the reference voltage Vref even after the fluctuations in the supply voltage V return to the acceptable range after the operation clock signal to the microcomputer 13 has been once halted, the microcomputer 13 can be reset if the supply voltage V becomes lower than the reference voltage Vref after halting the supply of the internal clock to the microcomputer 13.

This offers an advantage of being able to positively prevent the malfunction of the microcomputer 13.

EMBODIMENT 5

Figure 5:
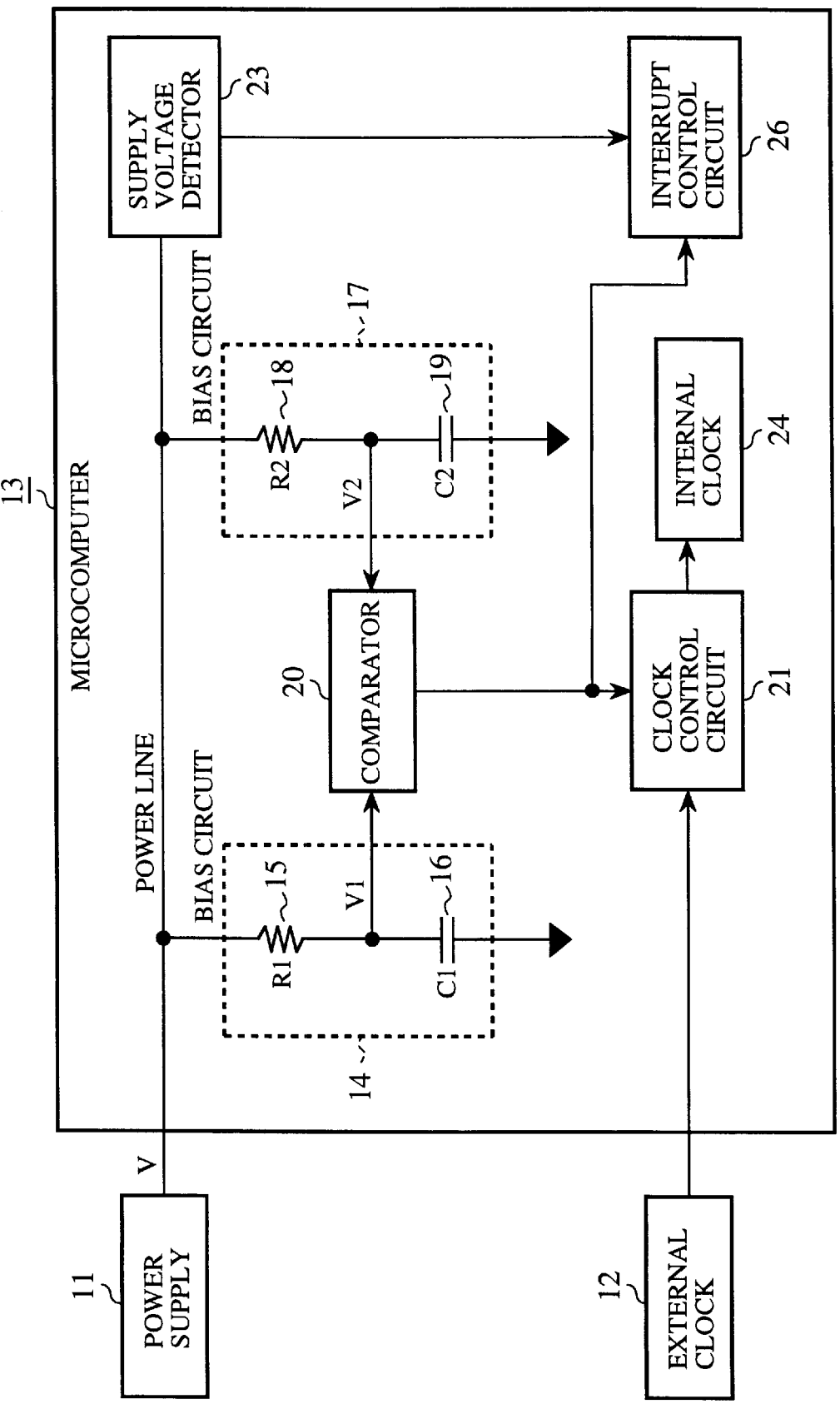
FIG. 5 is a block diagram showing a configuration of an embodiment 5 of the microcomputer malfunction preventive apparatus in accordance with the present invention.

FIG. 5 is a block diagram showing a configuration of an embodiment 5 of the microcomputer malfunction preventive apparatus in accordance with the present invention. In FIG. 5, the same or like portions to those of FIG. 3 are designated by the same reference numerals, and the description thereof is omitted here.

The reference numeral 26 designates an interrupt control circuit for generating an interrupt signal to cause the microcomputer 13 to execute prescribed interrupt services when the supply voltage V becomes lower than the reference voltage Vref after the internal clock 24 halts supplying the operation clock signal to the microcomputer 13.

Next, the operation of the present embodiment 5 will be described.

Although the microcomputer 13 is reset in the foregoing embodiment 4 when the supply voltage V falls below the reference voltage Vref after halting supplying the internal clock to the microcomputer 13, it is possible for the microcomputer 13 to execute the prescribed interrupt services when the supply voltage V falls below the reference voltage Vref after the halt of supplying the internal clock to the microcomputer 13.

More specifically, when the supply voltage V falls below the reference voltage Vref after the fluctuations in the supply voltage V deviate from the acceptable range, it is possible for the microcomputer 13 to control an external control device by means of software, or to diagnose whether the entire system is in a normal state or not.

Thus providing the microcomputer 13 with a function to execute using software the post-processing after detecting the instability of the power supply can offer an advantage of being able to widen its applicability because of the processing flexibility provided.

EMBODIMENT 6

Figure 6:
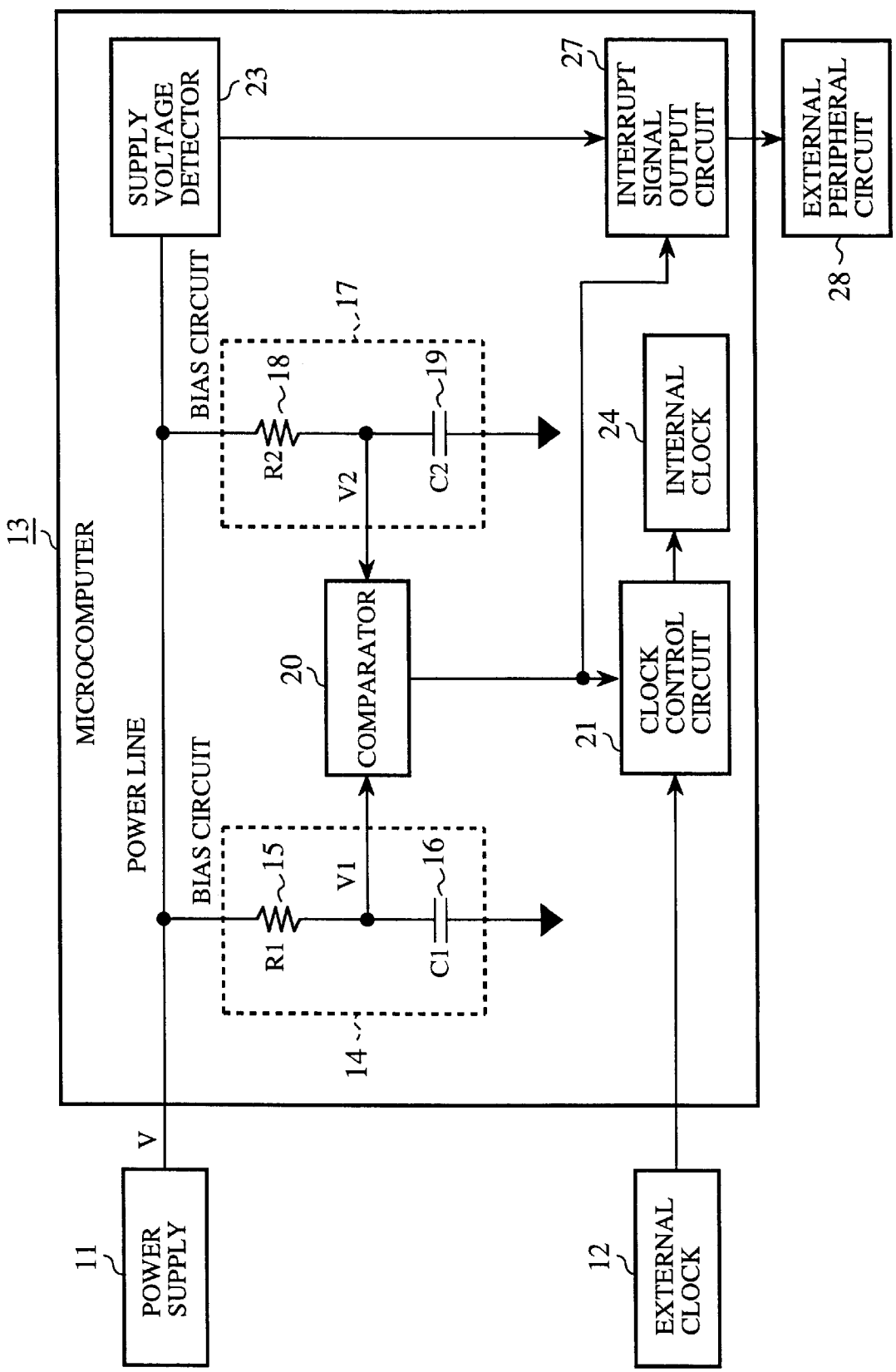
FIG. 6 is a block diagram showing a configuration of an embodiment 6 of the microcomputer malfunction preventive apparatus in accordance with the present invention.
Figure 7:
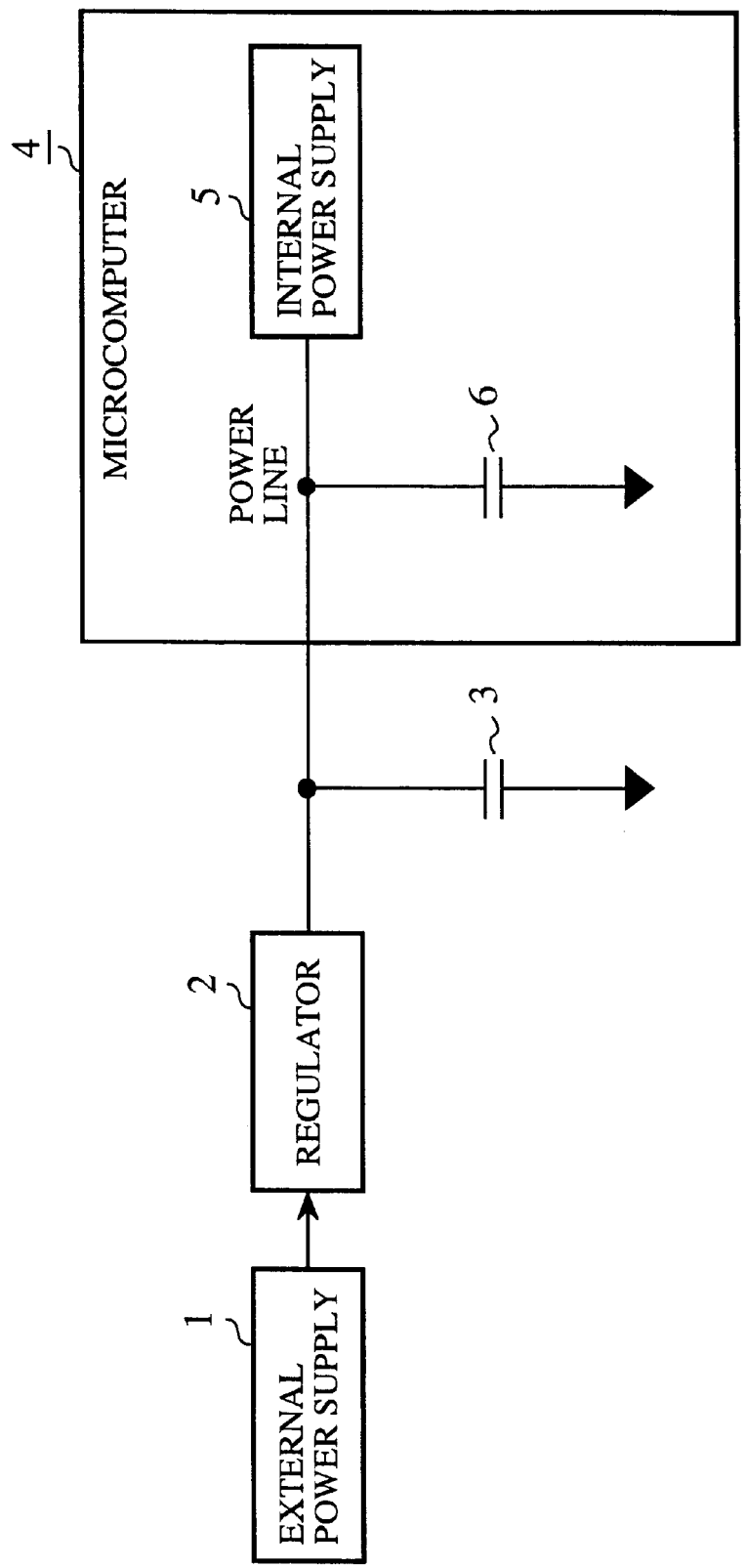
FIG. 7 is a block diagram showing a configuration of a conventional microcomputer malfunction preventive apparatus.

FIG. 6 is a block diagram showing a configuration of an embodiment 6 of the microcomputer malfunction preventive apparatus in accordance with the present invention. In FIG. 6, the same or like portions to those of FIG. 3 are designated by the same reference numerals, and the description thereof is omitted here.

The reference numeral 27 designates an interrupt signal output circuit for generating an interrupt signal for causing an external peripheral circuit 28 outside the microcomputer 13 to execute prescribed interrupt services when the supply voltage V falls below the reference voltage Vref after the internal clock 24 halts supplying the operation clock signal to the microcomputer 13; and 28 designates the external peripheral circuit for executing the fault diagnosis of the entire system including the microcomputer 13 in response to the interrupt signal fed from the interrupt signal output circuit 27.

Next, the operation of the present embodiment 6 will be described.

Although the interrupt control circuit 26 generates the interrupt signal to have the microcomputer 13 execute the prescribed interrupt services in the foregoing embodiment 5, the external peripheral circuit 28 of the microcomputer 13 can also execute the prescribed interrupt services, offering substantially the same advantage of the foregoing embodiment 5.

What is claimed is:

1. A microcomputer malfunction prevention apparatus comprising:
    a fluctuation detector for detecting rate of change of a supply voltage; and
    a clock controller for halting supplying of a clock signal having a first frequency to a microcomputer when the rate of change detected by said fluctuation detector deviates from an acceptable rate of change range, and for resuming supplying of the clock signal to the microcomputer when the rate of change returns to the acceptable rate of change range.

2. The microcomputer malfunction prevention apparatus according to claim 1, wherein said fluctuation detector comprises:
    a first bias circuit connected to a power line and having a first time constant;
    a second bias circuit connected to the power line, and having a second time constant different from the first time constant of said first bias circuit; and
    a comparator for comparing an output voltage of said first bias circuit with an output voltage of said second bias circuit.

3. The microcomputer malfunction prevention apparatus according to claim 1, further comprising a voltage detector for detecting the supply voltage, wherein said clock controller continues halting supplying of the clock signal to the microcomputer if the supply voltage detected by said voltage detector is lower than a reference voltage, even after the rate of change detected by said fluctuation detector returns to the acceptable rate of change range after the supplying of the clock signal to the microcomputer has been halted.

4. The microcomputer malfunction prevention apparatus according to claim 1, further comprising a voltage detector for detecting the supply voltage, wherein said clock controller supplies the microcomputer with a secondary clock signal having a second frequency lower than the first frequency of the clock signal if the supply voltage detected by said voltage detector is lower than a reference voltage, even after the rate of change detected by said fluctuation detector returns to the acceptable rate of change range after said clock controller halts the supplying of the clock signal to the microcomputer.

5. The microcomputer malfunction prevention apparatus according to claim 1, further comprising:
    a voltage detector for detecting the supply voltage; and
    a reset circuit for resetting the microcomputer when the supply voltage detected by said voltage detector falls below a reference voltage after said clock controller halts supplying of the clock signal to the microcomputer.

6. The microcomputer malfunction prevention apparatus according to claim 1, further comprising:
    a voltage detector for detecting the supply voltage; and
    an interrupt controller for generating an interrupt signal when the supply voltage detected by said voltage detector falls below a reference voltage after said clock controller halts supplying of the clock signal to the microcomputer.

7. A microcomputer malfunction prevention method comprising:
    monitoring rate of change of a supply voltage;
    halting supplying of a clock signal having a first frequency to a microcomputer when the rate of change of the supply voltage deviates from an acceptable rate of change range; and
    resuming supplying of the clock signal to the microcomputer when the rate of change returns to the acceptable range.

8. The microcomputer malfunction prevention method according to claim 7, further comprising continuing halting the supplying of the clock signal to the microcomputer if the supply voltage is lower than a reference voltage, even after the rate of change of the supply voltage returns to the acceptable rate of change range after the supplying of the clock signal to the microcomputer has been halted.

9. The microcomputer malfunction prevention method according to claim 7, further comprising supplying the microcomputer with a secondary clock signal with a second frequency lower than the first frequency of the clock signal if the supply voltage is lower than a reference voltage, even after the rate of change of the supply voltage returns to the acceptable rate of change range after the supplying of the clock signal to the microcomputer has been halted.

10. The microcomputer malfunction prevention method according to claim 7, further comprising resetting the microcomputer when the supply voltage falls below a reference voltage after the supplying of the clock signal to the microcomputer has been halted.

11. The microcomputer malfunction prevention method according to claim 7, further comprising generating an interrupt signal when the supply voltage falls below a reference voltage after the supplying of the clock signal to the microcomputer has been halted.

* * * * *